(12) United States Patent
Zagorski et al.

(10) Patent No.: US 8,731,742 B2
(45) Date of Patent: May 20, 2014

(54) TARGET VEHICLE MOVEMENT CLASSIFICATION

(75) Inventors: Chad T. Zagorski, Clarkston, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 103 days.

(21) Appl. No.: 13/440,193

(22) Filed: Apr. 5, 2012

(65) Prior Publication Data

US 2013/0268184 A1 Oct. 10, 2013

(51) Int. Cl.
*G01C 23/00* (2006.01)
*G05D 1/00* (2006.01)
*G05D 3/00* (2006.01)
*G06F 7/00* (2006.01)

(52) U.S. Cl.
USPC .......................................................... 701/3

(58) Field of Classification Search
USPC .......................................................... 701/3
See application file for complete search history.

(56) References Cited

U.S. PATENT DOCUMENTS

2012/0083960 A1* 4/2012 Zhu et al. ................... 701/23
2013/0110368 A1* 5/2013 Zagorski ..................... 701/70

* cited by examiner

*Primary Examiner* — Mary Cheung
*Assistant Examiner* — Frederick Brushaber
(74) *Attorney, Agent, or Firm* — Ingrassia Fisher & Lorenz, P.C.

(57) ABSTRACT

Methods, program products, and vehicles are provided for classifying movement of target vehicles in proximity to a host vehicle and taking appropriate action based on the classification. An active safety system is coupled to a drive system, and is configured to provide an action during a drive cycle of the vehicle. The active safety system comprises a detection unit and a processor. The detection unit is configured to measure movement of a target vehicle in proximity to a host vehicle. The processor is coupled to the detection unit, and is configured to assess a pattern of the movement of the target vehicle relative to the host vehicle or a third vehicle, classify the movement of the target vehicle based on the pattern to generate a classification, the classification pertaining to a deviation from a typical vehicle movement, and take action based on the classification.

17 Claims, 5 Drawing Sheets

TARGET VEHICLE MOVEMENT CLASSIFICATION

TECHNICAL FIELD

The present disclosure generally relates to the field of vehicles and, more specifically, to methods and systems for classifying movement of target vehicles toward a host vehicle, such as an automobile.

BACKGROUND

Many vehicles today have active safety systems, such as a forward collision alert (FCA) system, collision imminent braking system (CIB), collision preparation system (CPS), and/or enhanced collision avoidance (ECA) system. Such active safety functionality supplements traditional driver control of the vehicle with one or more warnings or automated actions, such as automatic braking and/or steering, in appropriate conditions, such as when another target vehicle is detected in proximity to the vehicle. While active safety functionality serves valuable purposes, it may be desirable to tailor the active safety actions to particular types of detected target vehicles, and/or to classify different types of detected target vehicles.

Accordingly, it is desirable to provide improved methods for classifying movement of target vehicles in proximity to a host vehicle and taking appropriate action based on the classification. It is also desirable to provide improved program products and systems for such classification of movement of target vehicles in proximity to a host vehicle and taking of appropriate action based on the classification. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises the steps of measuring movement of a target vehicle in proximity to a host vehicle, assessing a pattern of the movement of the target vehicle relative to the host vehicle or a third vehicle, classifying the movement of the target vehicle based on the pattern to generate a classification, the classification pertaining to a deviation from a typical vehicle movement via a processor, and taking action based on the classification.

In accordance with another exemplary embodiment, a program product is provided. The program product comprises a program and a non-transitory computer-readable storage medium. The program is configured to at least facilitate measuring movement of a target vehicle in proximity to a host vehicle, assessing a pattern of the movement of the target vehicle relative to the host vehicle or a third vehicle, classifying the movement of the target vehicle based on the pattern to generate a classification, the classification pertaining to a deviation from a typical vehicle movement, and taking action based on the classification. The non-transitory computer-readable storage medium stored the program.

In accordance with a further exemplary embodiment, a vehicle is provided. The vehicle comprises a drive system and an active safety system. The active safety system is coupled to the drive system. The active safety system comprises a detection unit and a processor. The detection unit is configured to measure movement of a target vehicle in proximity to a host vehicle. The processor is coupled to the detection unit, and is configured to assess a pattern of the movement of the target vehicle relative to the host vehicle or a third vehicle, classify the movement of the target vehicle based on the pattern to generate a classification, the classification pertaining to a deviation from a typical vehicle movement, and take action based on the classification.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
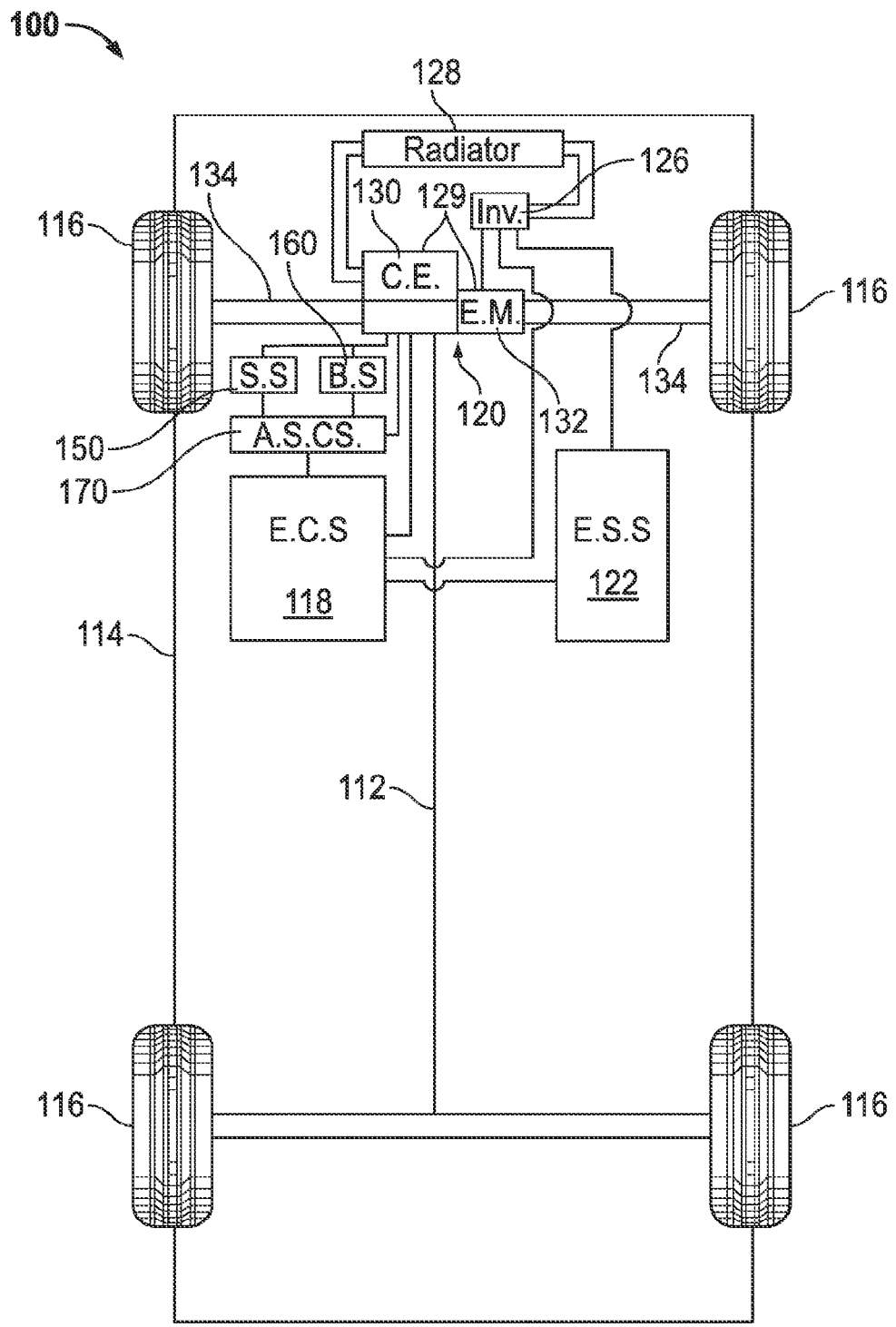
FIG. 1 is a functional block diagram of a vehicle that includes an active safety control system, in accordance with an exemplary embodiment.

FIG. 1 illustrates a vehicle 100, or automobile, according to an exemplary embodiment. The vehicle 100 is also referenced at various points throughout this Application as the host vehicle. As described in greater detail further below, the host vehicle 100 includes an active safety control system ("ASCS") 170 that classifies movement of vehicles proximate the host vehicle (referred to herein as target vehicles) for optimized control of active safety functionality for the host vehicle 100 that is based at least in part on the classification.

Figure 5:
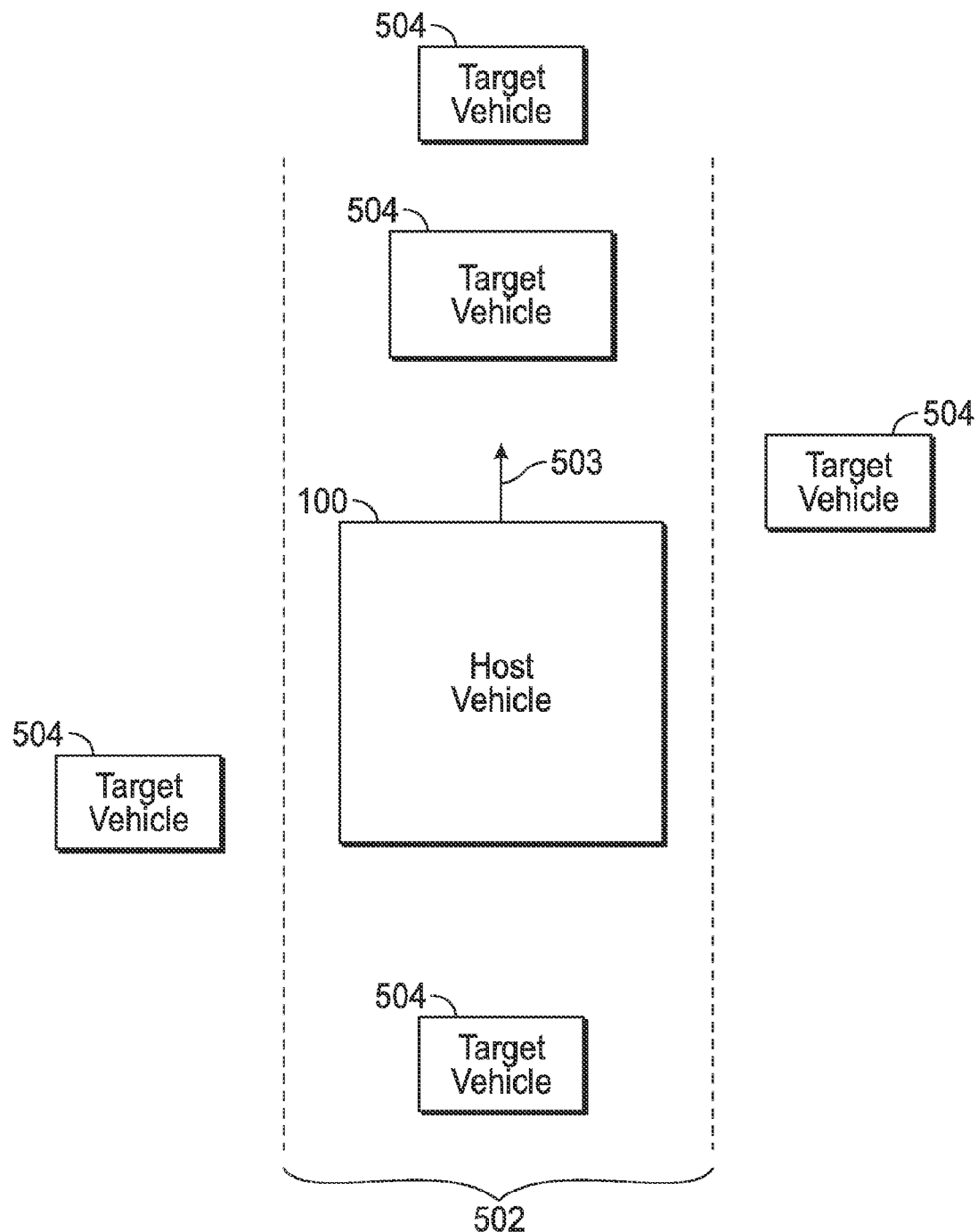
FIG. 5 is a schematic drawing illustration of the vehicle of FIG. 1 travelling within a road lane in proximity to possible target vehicles, in accordance with an exemplary embodiment.

As depicted in FIG. 5, the host vehicle 100 is travelling within a lane 502 of a road or other path in a direction 503. The host vehicle 100 may be surrounded by one or more target vehicles 504. The target vehicles 504 may be classified in terms of benign driving behavior, an erratic driving behavior toward the host vehicle 100 or toward another one of the target vehicles 504 (also referred to herein as a third vehicle), or an aggressive driving behavior toward the host vehicle 100 or toward such a third vehicle. As used throughout this Application, a "third vehicle" refers to a vehicle that is in proximity to the host vehicle or a particular target vehicle that is proximate the host vehicle.

With reference again to FIG. 1, the host vehicle 100 includes a chassis 112, a body 114, four wheels 116, an electronic control system 118, a steering system 150, a braking system 160, and the above-referenced active safety control system 170. The body 114 is arranged on the chassis 112 and substantially encloses the other components of the host vehicle 100. The body 114 and the chassis 112 may jointly form a frame. The wheels 116 are each rotationally coupled to the chassis 112 near a respective corner of the body 114.

The host vehicle 100 (as well as each of the target vehicles and third vehicles) may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The host vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the host vehicle 100 is a hybrid electric vehicle (HEV), and further includes an actuator assembly 120, an energy storage system (ESS) 122, a power inverter assembly (or inverter) 126, and a radiator 128. The actuator assembly 120 includes at least one electric propulsion system 129 mounted on the chassis 112 that drives the wheels 116. In the depicted embodiment, the actuator assembly 120 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the host vehicle 100 is a "series HEV," in which the combustion engine 130 is not directly coupled to the transmission, but coupled to a generator (not shown), which is used to power the electric motor 132. In another embodiment, the host vehicle 100 is a "parallel HEV," in which the combustion engine 130 is directly coupled to the transmission by, for example, having the rotor of the electric motor 132 rotationally coupled to the drive shaft of the combustion engine 130.

The ESS 122 is mounted on the chassis 112, and is electrically connected to the inverter 126. The ESS 122 preferably comprises a battery having a pack of battery cells. In one embodiment, the ESS 122 comprises a lithium iron phosphate battery, such as a nanophosphate lithium ion battery. Together the ESS 122 and electric propulsion system(s) 129 provide a drive system to propel the host vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

The steering system 150 is mounted on the chassis 112, and controls steering of the wheels 116. The steering system 150 includes a steering wheel and a steering column (not depicted). The steering wheel receives inputs from a driver of the host vehicle. The steering column results in desired steering angles for the wheels 116 via the drive shafts 134 based on the inputs from the driver.

The braking system 160 is mounted on the chassis 112, and provides braking for the host vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the host vehicle, as well as various other inputs for various vehicle devices and/or systems, such as one or more vehicle radios, other entertainment systems, environmental control systems, lightning units, navigation systems, and the like (also not depicted).

The ASCS 170 is mounted on the chassis 112. The ASCS 170 may be coupled to various other vehicle devices and systems, such as, among others, the actuator assembly 120, the steering system 150, the braking system 160, and the electronic control system 118. The ASCS 170 identifies target vehicles proximate the host vehicle and provides various active safety controls (including adjustments for active safety systems such as automatic braking systems such as collision imminent braking systems (CIB), collision preparation systems (CPS), automatic steering systems such as enhanced collision avoidance (ECA) systems, adaptive cruise control (ACC), and forward collision alert (FCA) systems) based at least in part on the identification of the target vehicles in proximity to the host vehicle. In addition, although not illustrated as such, the ASCS 170 (and/or one or more components thereof) may be integral with the electronic control system 118 and may also include one or more power sources. The ASCS 170 preferably conducts various steps of the process 300 and the steps and sub-processes thereof of FIGS. 3 AND 4.

Figure 2:
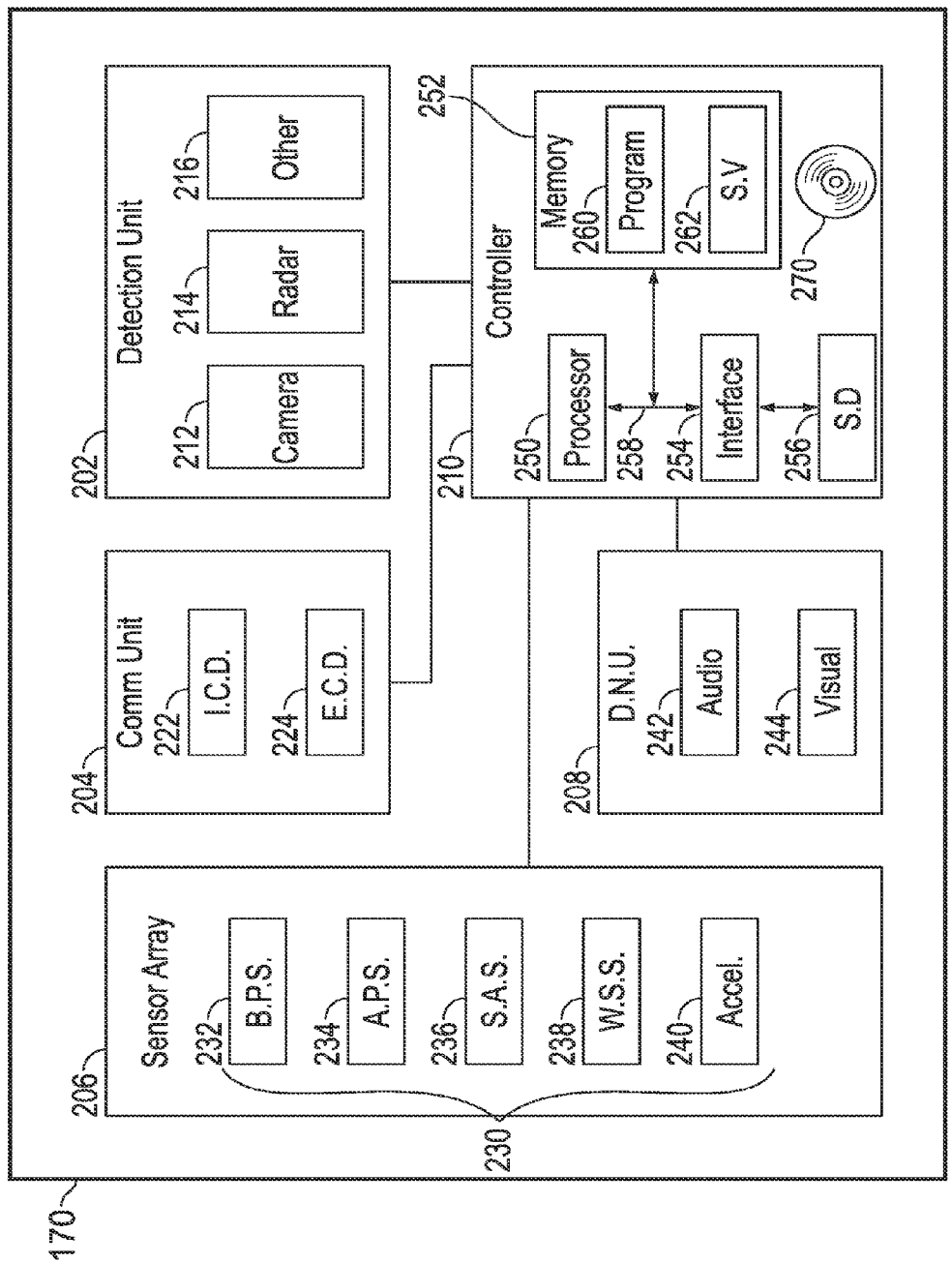
FIG. 2 is a functional block diagram of an active safety control system that can be used in connection with the vehicle of FIG. 1, in accordance with an exemplary embodiment.

With reference to FIG. 2, a functional block diagram is provided for the ASCS 170 of FIG. 1, in accordance with an exemplary embodiment. As depicted in FIG. 2, the ASCS 170 includes a detection unit 202, a communication unit 204, a sensor array 206, a driver notification unit 208, and a controller 210.

The detection unit 202 is used to detect target vehicles in proximity to the host vehicle and other nearby vehicles, and to obtain information pertaining thereto (such as information pertaining to position and movement of the target vehicles). The detection unit 202 provides these various types of information to the controller 210 for processing and for use in classifying the target vehicles detected by the detection unit 202 for use in controlling the active safety functionality for the host vehicle. In the depicted embodiment, the detection unit 202 includes one or more cameras 212 and/or other vision-based detection devices, radar devices 214 (such as long and short range radar detection devices), and/or other target vehicle detection devices 216 such as, by way of example, light detection and ranging (LIDAR) and/or vehicle-to-vehicle (V2V) communications.

The communication unit 204 receives information regarding data as to position, movement, and operation of the host vehicle and/or pertaining to target vehicles and/or other vehicles in proximity to the host vehicle. Specifically, in one embodiment, the communication unit 204 receives information as to one or more of the following: driver inputs for an accelerator pedal of the host vehicle, driver inputs for a brake pedal of the host vehicle, a driver's engagement of a steering wheel of the host vehicle, information as to lateral and longitudinal positions, velocities, and accelerations of the host vehicle, and information as to lateral and longitudinal positions, velocities, and accelerations of target vehicles in proximity to the host vehicle. In one embodiment, the communication unit 204 provides these various types of information to the controller 210 for processing and for use in classifying the target vehicles detected by the detection unit 202 for use in controlling the active safety functionality for the host vehicle. Per the discussion further below, in certain embodiments, some or all of this information may be provided instead by the sensor array 206.

As used throughout this application, (i) a longitudinal position of a target vehicle comprises a position of the host target vehicle with respect to a longitudinal direction of movement of the host vehicle; (ii) a longitudinal velocity of a target vehicle comprises a velocity of the host target vehicle with respect to a longitudinal direction of movement of the host vehicle; and (iii) a longitudinal acceleration of a target vehicle comprises a component of an acceleration of the host target vehicle with respect to a longitudinal direction of movement of the host vehicle. Also as used throughout this application, (i) a lateral position of a target vehicle comprises a position of the host target vehicle that is perpendicular to a longitudinal direction of movement of the host vehicle; (ii) a lateral velocity of a target vehicle comprises a velocity of the host target vehicle that is perpendicular to a longitudinal direction of movement of the host vehicle; and (iii) a lateral acceleration of a target vehicle comprises a component of an acceleration of the host target vehicle that is perpendicular to a longitudinal direction of movement of the host vehicle.

In the depicted embodiment, the communication unit 204 includes an internal communication device 222 and an external communication device 224. The internal communication device 222 preferably comprises a transceiver configured to receive various of the above information from various other devices and systems of the host vehicle, outside of the ASCS 170, via a vehicle communications bus (not depicted). The external communication device 224 preferably comprises a transceiver (such as a vehicle telematics unit and/or a global system (GPS) device) configured to receive various of the above information from a central database and/or from a satellite system via a wireless network (not depicted).

The sensor array 206 measures parameters for data as to operating conditions and usage of the host vehicle. Specifically, in one embodiment, the sensor array 206 comprises various sensors 230 that measure values of parameters pertaining to one or more of the following: driver inputs for an accelerator pedal of the host vehicle, driver inputs for a brake pedal of the host vehicle, a driver's engagement of a steering wheel of the host vehicle, and information as to lateral and longitudinal positions, velocities, and accelerations of the host vehicle, and information as to lateral and longitudinal positions, velocities, and accelerations of target vehicles in proximity to the host vehicle 100.

In one embodiment, the sensor array 206 provides these various types of information to the controller 210 for processing and for use in classifying the target vehicles detected by the detection unit 202 for use in controlling the active safety functionality for the host vehicle. Per the discussion above, in certain embodiments, some or all of this information may be provided instead by the communication unit 204. As depicted in FIG. 2, the sensor array 206 includes one or more brake pedal sensors 232, accelerator pedal sensors 234, steering angle sensors 236, wheel speed sensors 238, yaw rate sensors, and/or accelerometers 240.

The brake pedal sensors 232 are coupled to or part of the braking system 160 of FIG. 1. The brake pedal sensors 232 include one or more brake pedal position sensors and/or brake pedal travel sensors. The brake pedal position sensor measures a position of the brake pedal or an indication as to how far the brake pedal has traveled when the operator applies force to the brake pedal. The brake pedal force sensor measures an amount of force applied to the brake pedal by the driver of the host vehicle.

The accelerator pedal sensors 234 are coupled to an accelerator pedal of the host vehicle. The accelerator pedal sensors 234 include one or more accelerator pedal position sensors and/or accelerator pedal travel sensors. The accelerator pedal position sensor measures a position of the accelerator pedal or an indication as to how far the accelerator pedal has traveled when the operator engages the accelerator pedal. The accelerator pedal force sensor measures an amount of force applied to the accelerator pedal by the driver of the host vehicle. In certain embodiments, an accelerator pedal position sensor may be used without an accelerator pedal force sensor, or vice versa.

The steering angle sensors 236 are coupled to or part of the steering system 150 of FIG. 1, and are preferably coupled to a steering wheel or steering column thereof. The steering angle sensors 236 measure an angular position of the steering column and/or steering wheel or an indication as to how far the steering wheel is turned (preferably, a steering wheel angle and gradient) when the operator engages a steering wheel of the steering column.

The wheel speed sensors 238 are coupled to one or more of the wheels 116 of FIG. 1. The wheel speed sensors 238 measure wheel speeds of the wheels 115 while the host vehicle is being operated. In one embodiment, each wheel speed sensor 238 measures a speed (or velocity) of a different respective wheel 116.

The accelerometers 240 measure an acceleration of the host vehicle. In certain embodiments, the accelerometers measure lateral and longitudinal acceleration of the host vehicle. In certain other embodiments, vehicle acceleration values are instead calculated by the controller 210 using velocity values, for example as calculated using the wheel speed values obtained from the wheel speed sensors 238.

The driver notification unit 208 provides notifications/alerts/warnings to the driver and other occupants of the host vehicle when movement of a target vehicle is classified as being erratic or aggressive with respect to the host vehicle or one or more third vehicles.

In the depicted embodiment, the driver notification unit 208 includes an audio component 242 and a visual component 244. The audio component 242 provides audio notifications/alerts/warnings (such as an audible alarm, a beeping sound, or a verbal description when a target vehicle is classified as having erratic or aggressive movement) to the driver and/or other occupants of the host vehicle. The visual component 244 provides visual notifications/alerts/warnings (such as an illuminated light, a flashing light, or a visual description when that target vehicle is classified as having erratic or aggressive movement) to the driver and/or other occupants of the host vehicle.

The controller 210 is coupled to the detection unit 202, the communication unit 204, the sensor array 206, and the driver notification unit 208. The controller 210 processes the data and information received from the detection unit 202, the communication unit 204, and the sensor array 206. Specifically, the controller 210 classifies movement of target vehicles in proximity to the host vehicle that are detected by the detection unit 202 using data and information obtained from the detection unit 202, the communication unit 204, and/or the sensor array 206. The controller 210 also utilizes the classification of the target vehicles to provide appropriate notifications/alerts/warnings via instructions provided to the driver notification unit 208 and also to control one or more aspects of active safety control (such as automatic steering and/or automatic braking) via instructions provided to the steering system 150 and/or the braking system 160 of FIG. 1 (and/or one or more other active safety systems, such as collision imminent braking systems (CIB), collision preparation systems (CPS), enhanced collision avoidance (ECA) systems, adaptive cruise control, and forward collision alert (FCA) systems). In a preferred embodiment, the controller 210 performs these functions in accordance with steps of the process 300 (and sub-processes and/or sub-steps thereof) described further below in connection with FIGS. 3 AND 4.

As depicted in FIG. 2, the controller 210 comprises a computer system. In certain embodiments, the controller 210 may also include one or more of the detection unit 202, the communication unit 204, the sensor array 206, the driver notification unit 208, and/or components thereof. In addition, it will be appreciated that the controller 210 may otherwise differ from the embodiment depicted in FIG. 2. For example, the controller 210 may be coupled to or may otherwise utilize one or more remote computer systems and/or other control systems.

In the depicted embodiment, the computer system of the controller 210 includes a processor 250, a memory 252, an interface 254, a storage device 256, and a bus 258. The processor 250 performs the computation and control functions of the controller 210, and may comprise any type of processor or multiple processors, single integrated circuits such as a microprocessor, or any suitable number of integrated circuit devices and/or circuit boards working in cooperation to accomplish the functions of a processing unit. During operation, the processor 250 executes one or more programs 260 contained within the memory 252 and, as such, controls the general operation of the controller 210 and the computer system of the controller 210, preferably in executing the steps of the processes described herein, such as the steps of the process 300 (and any sub-processes thereof) in connection with FIGS. 3 AND 4.

The memory 252 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 252 is located on and/or co-located on the same computer chip as the processor 250. In the depicted embodiment, the memory 252 stores the above-referenced program 260 along with one or more stored values 262 for use in classifying movement of target vehicles in proximity to the host vehicle and controlling active safety functionality for the host vehicle.

The bus 258 serves to transmit programs, data, status and other information or signals between the various components of the computer system of the controller 210. The interface 254 allows communication to the computer system of the controller 210, for example from a system driver and/or another computer system, and can be implemented using any suitable method and apparatus. It can include one or more network interfaces to communicate with other systems or components. The interface 254 may also include one or more network interfaces to communicate with technicians, and/or one or more storage interfaces to connect to storage apparatuses, such as the storage device 256.

The storage device 256 can be any suitable type of storage apparatus, including direct access storage devices such as hard disk drives, flash systems, floppy disk drives and optical disk drives. In one exemplary embodiment, the storage device 256 comprises a program product from which memory 252 can receive a program 260 that executes one or more embodiments of one or more processes of the present disclosure, such as the steps of the process 300 (and any sub-processes thereof) of FIGS. 3 AND 4, described further below. In another exemplary embodiment, the program product may be directly stored in and/or otherwise accessed by the memory 252 and/or a disk (e.g., disk 270), such as that referenced below.

The bus 258 can be any suitable physical or logical means of connecting computer systems and components. This includes, but is not limited to, direct hard-wired connections, fiber optics, infrared and wireless bus technologies. During operation, the program 260 is stored in the memory 252 and executed by the processor 250.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 250) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 210 may also otherwise differ from the embodiment depicted in FIG. 2, for example in that the computer system of the controller 210 may be coupled to or may otherwise utilize one or more remote computer systems and/or other control systems.

Figure 3:
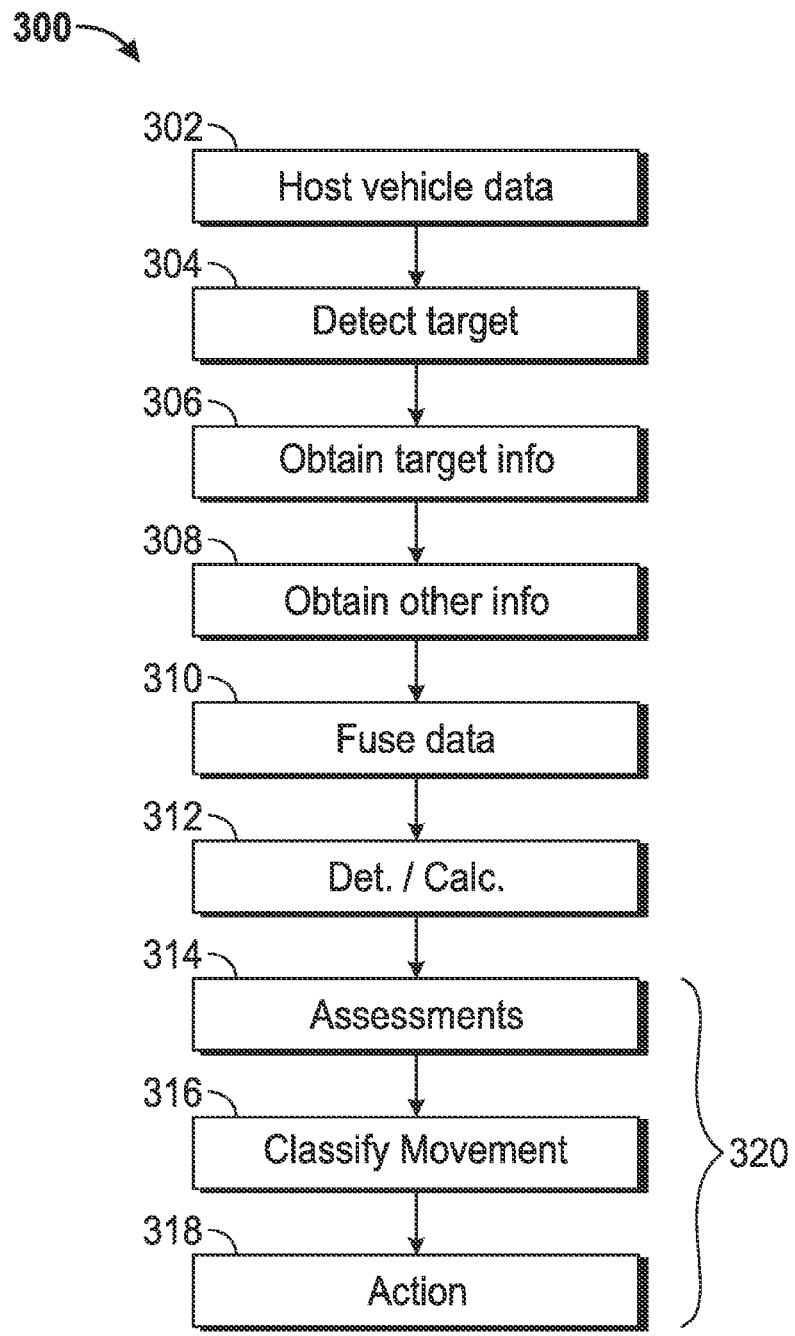
FIG. 3 is a flowchart of a process for classifying movement of target vehicles in proximity to a host vehicle or a third vehicle and controlling an active safety control system of the vehicle, and that can be used in connection with the vehicle of FIG. 1 and the active safety control system of FIGS. 1 and 2, in accordance with an exemplary embodiment.

FIG. 3 is a flowchart of a process 300 for classifying movement of target vehicles in proximity to a host vehicle and controlling an active safety control system of the host vehicle, in accordance with an exemplary embodiment. The process 300 will also be described further below in connection with FIG. 4, which depicts exemplary sub-processes thereof. The process 300 can be used in connection with the host vehicle 100 of FIGS. 1 and 2, the ASCS 170 of FIGS. 1 and 2, and target vehicles and other vehicles, such as the vehicles 504 of FIG. 5. References to the host vehicle or host vehicle herein may pertain to the host vehicle 100 of FIGS. 1 and 5 (including the ASCS 170 of FIGS. 1 and 2), and references to the target vehicle or third vehicle may pertain to the target vehicles 504 (or similar target vehicles, which may vary in placement from those depicted in FIG. 5), in accordance with an exemplary embodiment. The process 300 is preferably performed continuously during a current drive cycle (or ignition cycle) of the host vehicle.

The process includes the step of obtaining host vehicle data (step 302). The host vehicle data preferably includes data and related information pertaining to lateral and longitudinal positions, velocities, and accelerations of the host vehicle (preferably pertaining to measurements of one or more sensors 230, such as the wheel speed sensors 238 and/or accelerometers 240 of FIG. 2 and/or via communications provided by the communication unit 204 of FIG. 2), as well as measures of a driver's engagement of a brake pedal, accelerator pedal, and steering wheel of the host vehicle (preferably pertaining to measurements of various sensors 230, such as the brake pedal sensors 232, the accelerator pedal sensors 234, and the steering angle sensors 236 of FIG. 2, respectively and/or via communications provided by the communication unit 204 of FIG. 2), in addition to data and information pertaining to a direction of travel of the host vehicle as well as systems and algorithms being run in the host vehicle (preferably via communications provided by the communication unit 204 of FIG. 2). The vehicle data of step 302 is gathered throughout the drive cycle of the host vehicle, preferably continuously, and provided to the processor 250 of FIG. 2 for processing.

In accordance with various embodiments, a target vehicle is detected in proximity to the host vehicle (step 304). The target vehicle is preferably detected by the detection unit 202 of FIG. 2, most preferably by one or more of the cameras 212, radar devices 214, and/or other devices 216 thereof.

Information pertaining to the detected target vehicle are also obtained (step 306). The target vehicle data preferably includes data and related information pertaining to lateral and longitudinal positions, lateral and longitudinal velocities, and lateral and longitudinal accelerations of the target vehicle. This information is preferably obtained via the detection unit 202 of FIG. 2, most preferably by one or more of the cameras 212, radar devices 214, and/or other devices 216 thereof, and provided to the processor 250 of FIG. 2 for processing. In addition, the processor 250 of FIG. 2 assigns a unique pseudo-random identifier for each such detected target vehicle. The target vehicle data of step 306 is gathered throughout the drive cycle of the host vehicle, preferably continuously.

In addition, for each target vehicle, information is also obtained pertaining to other vehicles (also referred to herein as third vehicles) in proximity to the detected target vehicle (step 308). Such information (also referred to herein as third party vehicle information) preferably includes data and related information pertaining to lateral and longitudinal positions, lateral and longitudinal velocities, and lateral and longitudinal accelerations of the third vehicles. This information is preferably obtained via the detection unit 202 of FIG. 2, most preferably by one or more of the cameras 212, radar devices 214, and/or other devices 216 thereof, and provided to the processor 250 of FIG. 2 for processing. In addition, the processor 250 of FIG. 2 assigns a unique pseudo-random identifier for each such detected third vehicle. The third vehicle data of step 308 is gathered throughout the drive cycle of the host vehicle, preferably continuously.

In certain embodiments, the data (for example, from steps 304 and 306) are fused, reconciled, aggregated, or otherwise combined together (step 310). For example, measurements from multiple sources (such as cameras 212, radar devices 214, and/or other devices 216 of the detection unit 202 of FIG. 2) may be combined together using average values, or using a weighted average considering the relative strengths of certain types of sensing technology for certain types of measurements as compared with other types of sensing technology. The fusion of data in step 310 is preferably performed by the processor 250 of FIG. 2.

Various determinations and calculations are also performed regarding the data pertaining to the host vehicle, the target vehicle, and the one or more third vehicles (step 312). The determinations and calculations utilize the host vehicle data of step 302, the target vehicle data of step 306, the third vehicle data 308, and the fused data of step 310, and yield calculated results pertaining to lateral and longitudinal positions, ranges, velocities, and accelerations of the host vehicle, the target vehicle, and any additional (or "third") vehicles, along with relative measures of these and/or related parameters between the vehicles. The calculations and determinations of step 312 are preferably performed by the processor 250 of FIG. 2 throughout the drive cycle of the host vehicle, preferably continuously, and are utilized by the processor 250 of FIG. 2 for further processing in classifying movement of the target vehicles and controlling one or more active safety features, such as described below.

Specifically, for each identified target vehicle, an assessment is made as to one or more patterns of the movement of the target vehicle, including measures of movement of the target vehicle relative to the host vehicle and any nearby third vehicles (step 314). The patterns may include variation and trends among the values calculated in step 312, and may also include derived parameters that may be calculated using the values from step 312 (such as a standard deviation of a lateral velocity of the target, a minimum lateral range of the target, a standard deviation of the lateral range between targets, a standard deviation of the longitudinal range acceleration of the target, a longitudinal velocity of the target, a relative longitudinal acceleration between the target and host vehicles, a standard deviation of the longitudinal acceleration of the host vehicle, a vector closing rate for the target vehicle, and a standard deviation of the vector closing rate). The assessment of the patterns in step 314 is preferably performed by the processor 250 of FIG. 1.

The movement of the target vehicle is classified based on the one or more patterns to generate a classification (step 316). The classification pertains to a deviation from a typical vehicle movement under conditions for the current vehicle cycle. Specifically, in a preferred embodiment, the patterns of step 314 are used to classify the movement of the target vehicle as falling under one of five categories, namely: benign driving, erratic driving toward a third vehicle (i.e., erratic driving with respect to a vehicle other than the host vehicle), erratic driving toward the host vehicle, aggressive driving toward a third vehicle (i.e., aggressive driving toward a vehicle other than the host vehicle), and aggressive driving toward the host vehicle.

In particular, the target vehicle is classified as (i) benign driving if the pattern represents typical driving, (ii) erratic toward the third vehicle if the pattern represents a first deviation from the typical vehicle movement in proximity to, or with respect to, the third vehicle, (iii) erratic toward the host vehicle if the pattern represents the first deviation from the typical vehicle movement in proximity to, or with respect to, the host vehicle, (iv) aggressive toward the third vehicle if the pattern represents the second deviation from the typical vehicle movement in proximity to, or with respect to, the third vehicle, and (v) aggressive toward the host vehicle if the pattern represents the second deviation from the typical vehicle movement in proximity to, or with respect to, the host vehicle, with the second deviation being relatively greater than the first deviation. In various embodiments, the classification is made based on calculated values of the movement of the target vehicle based on a relative velocity of the target vehicle relative to the host vehicle or the third vehicle, a vector closing rate between the target vehicle and the host vehicle or the third vehicle, a lateral range between the target vehicle and the host vehicle or the third vehicle, a longitudinal range acceleration between the target vehicle and the host vehicle or the third vehicle, a longitudinal velocity of the target vehicle, and/or one or more other calculated values (such as those described further below in connection with FIG. 4). The classifications of step 316 are preferably performed by the processor 250 of FIG. 1.

One or more actions are taken based on the classification (step 318). In one embodiment, (i) a first action is taken if the movement of the target vehicle is classified as erratic toward the third vehicle, (ii) a second action is taken if the movement of the target vehicle is classified as aggressive toward the third vehicle, (iii) a third action is taken if the movement of the target vehicle is classified as erratic toward the host vehicle, and (iv) a fourth action is taken if the movement of the target vehicle is classified as aggressive toward the host vehicle, wherein the first action, the second action, the third action, and the fourth action are each different from one another.

Each of the actions of step 318 preferably includes a warning. The warning preferably comprises an audio and/or visual warning (such as a verbal and/or audible notification provided by the driver notification unit 208 of FIG. 2. In addition, the action may include one or more remedial actions. Such remedial actions may include modification of entrance thresholds for triggering active safety features of the active safety control system 170 of FIG. 1 based on the type of classification. Such thresholds may include, among others, thresholds for automatic braking and automatic steering systems, among other active safety features, such as collision imminent braking systems (CIB), collision preparation systems (CPS), enhanced collision avoidance (ECA) systems, adaptive cruise control (ACC), and forward collision alert (FCA).

In one embodiment, (i) no warning or action is provided if the target vehicle movement is classified as benign, (ii) a warning, but no further action, is provided if the target vehicle movement is classified as erratic toward a third vehicle, (iii) a warning is provided, along with a first adjustment to one or more of the active safety thresholds if the target vehicle movement is classified as aggressive toward the third vehicle, (iv) a warning is provided, along with a second adjustment (that is preferably greater than the first adjustment) to one or more active safety thresholds if the target vehicle movement is classified as erratic toward the host vehicle, and (v) a warning is provided, along with a third adjustment (that is preferably greater than the first and second adjustments) to one or more active safety thresholds if the target vehicle movement is classified as aggressive toward the host vehicle. In certain embodiments, warnings may not be provided based on movement classification, but entrance criteria for the warning/braking/steering actions are adjusted based on the classification. In addition, in certain embodiments, an increase in headway distance/time headway for adaptive cruise control is provided depending on the target classification (for example, a greater time headway may be utilized for a given headway setting and vehicle speed if the target is moving aggressively toward other vehicles, and the like).

Accordingly, the actions may be implemented with increasing speed and/or magnitude as the potential threats to the host vehicle increase, based on the classification of the target vehicle. For example, automatic braking and/or automatic steering (and/or other automatic safety functionality) may be implemented (i) sooner than normal (for example, based on a first distance or time threshold of the target vehicle approaching the host vehicle that is greater than under normal operating conditions) when movement of the target vehicle is classified as aggressive toward a third vehicle, (ii) even sooner (for example, based on a second distance or time threshold of the target vehicle approaching the host vehicle that is greater than the first distance or time threshold mentioned above) when movement of the target vehicle is classified as erratic toward the host vehicle, and (iii) sooner still (for example, based on a third distance or time threshold of the target vehicle approaching the host vehicle that is greater than the first and second distances or time thresholds mentioned above) when movement of the target vehicle is classified as aggressive toward the host vehicle In FIG. 3, the steps of assessing the patterns (step 314), classifying the movement of the target vehicle (step 316), and taking action based on the classification (step 318) are collectively referred to a combined step 320. Additional details regarding the combined step 320 are provided in FIG. 4, and are described directly below in connection therewith.

Figure 4:
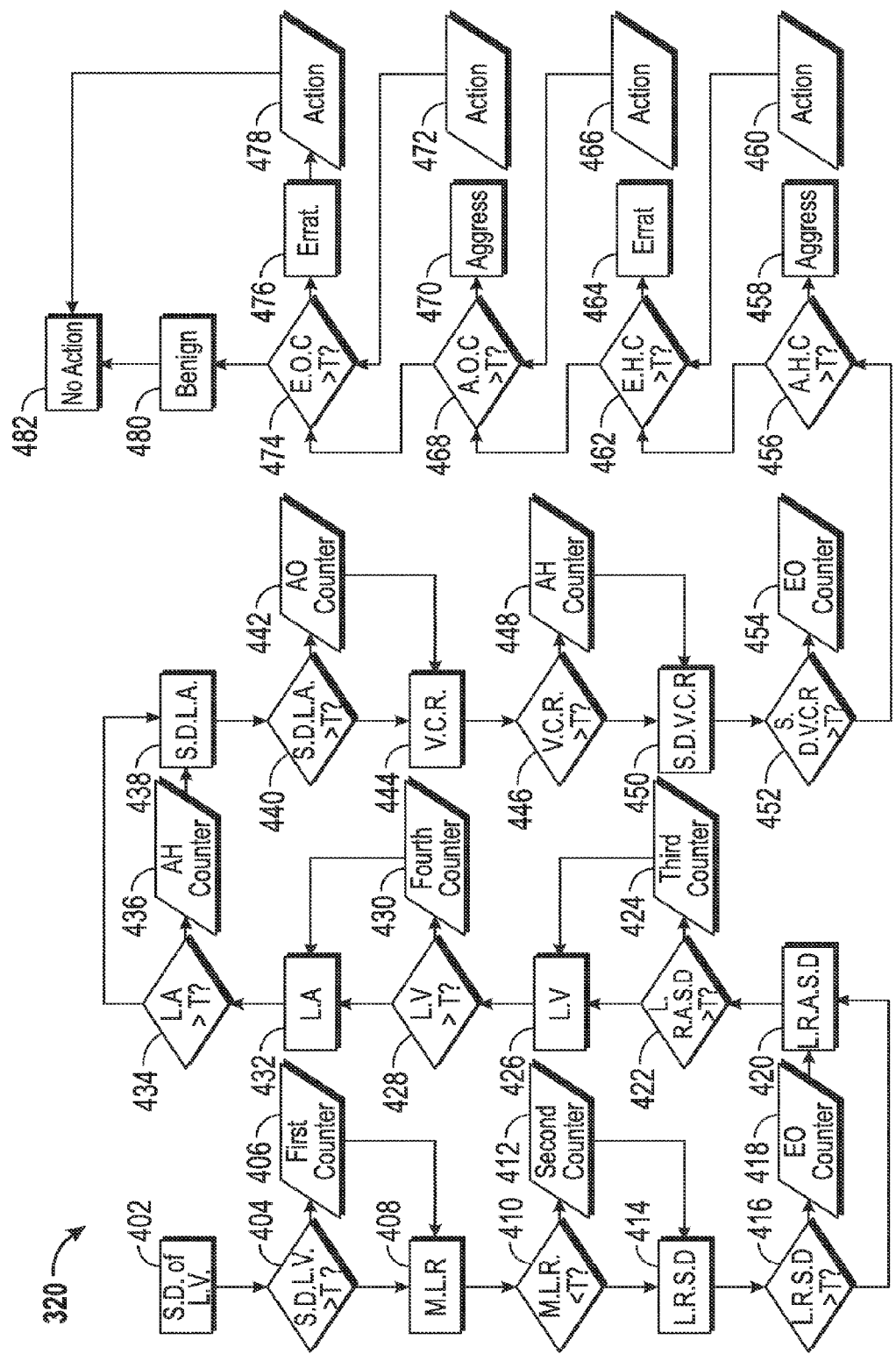
FIG. 4 is a flowchart of a combined step of the process of FIG. 3, including sub-steps of assessing a pattern of movement of the target vehicle, classifying the movement of the target vehicle based on the pattern, and taking action based on the classification, in accordance with an exemplary embodiment.

As depicted in FIG. 4, the combined step 320 includes calculating the standard deviation of the lateral velocity of each target vehicle relative to the host vehicle (step 402). This calculation is preferably performed by the processor 250 of FIG. 2 based on the data of steps 302-308 and/or the calculations of step 312. A determination is made, preferably by the processor 250 of FIG. 2, as to whether the standard deviation of the lateral velocity is greater than a predetermined threshold (step 404). The predetermined threshold of step 404 is preferably stored as one of the stored values 262 of the memory 252 of FIG. 2, and preferably represents an average or acceptable value of the standard deviation of the lateral velocity for typical vehicles that are operating in a benign or non-threatening manner with respect to other vehicles.

If it is determined in step 404 that the standard deviation of the lateral velocity is greater than the predetermined threshold of step 404, then a first counter is incremented (step 406). The first counter, also referred to herein as an EO Counter, is used for determining whether the target vehicle is moving in a manner that is erratic toward other vehicles. The EO Counter is preferably incremented by the processor 250 of FIG. 1. Conversely, if it is determined in step 404 that the standard deviation of the lateral velocity is less than or equal to the predetermined threshold of step 404, then the EO Counter is not incremented. In either case, the process proceeds to step 408, described directly below.

During step 408, a minimum lateral range is calculated between each target vehicle. Specifically, for a particular target vehicle, the minimum lateral range comprises the lateral range, or distance, between that particular target vehicle and the closest third vehicle to that target vehicle. This calculation is preferably performed by the processor 250 of FIG. 2 based on the data of steps 302-308 and/or the calculations of step 312. A determination is made, preferably by the processor 250 of FIG. 2, as to whether the minimum lateral range is less than a predetermined threshold (step 410). The predetermined threshold of step 410 is preferably stored as one of the stored values 262 of the memory 252 of FIG. 2, and preferably represents an average or acceptable value of the minimum lateral range for typical vehicles that are operating in a benign or non-threatening manner with respect to other vehicles.

If it is determined in step 410 that the minimum lateral range is less than the predetermined threshold of step 410, then a second counter is incremented (step 412). The second counter, also referred to herein as an AO Counter, is used for determining whether the target vehicle is moving in a manner that is aggressive toward other vehicles. The AO Counter is preferably incremented by the processor 250 of FIG. 1. Conversely, if it is determined in step 410 that the minimum lateral range is greater than or equal to the predetermined threshold of step 410, then the AO Counter is not incremented. In either case, the process proceeds to step 414, described directly below.

During step 414, a lateral range standard deviation is calculated between each target vehicle. Specifically, for a particular target vehicle, the lateral range standard deviation comprises the standard deviation of the lateral ranges of all of the third vehicles in proximity to the target vehicle. This calculation is preferably performed by the processor 250 of FIG. 2 based on the data of steps 302-308 and/or the calculations of step 312. A determination is made, preferably by the processor 250 of FIG. 2, as to whether the lateral range standard deviation is greater than a predetermined threshold (step 416). The predetermined threshold of step 416 is preferably stored as one of the stored values 262 of the memory 252 of FIG. 2, and preferably represents an average or acceptable value of the lateral range standard deviation for typical vehicles that are operating in a benign or non-threatening manner with respect to other vehicles.

If it is determined in step 416 that the lateral range standard deviation is greater than the predetermined threshold of step 416, then the EO Counter is incremented (step 418). The EO Counter is preferably incremented by the processor 250 of FIG. 1. Conversely, if it is determined in step 416 that the lateral range standard deviation is less than or equal to the predetermined threshold of step 416, then the EO Counter is not incremented. In either case, the process proceeds to step 420, described directly below.

During step 420, a standard deviation of the longitudinal range acceleration is calculated between each target vehicle. Specifically, for a particular target vehicle, this value comprises the standard deviation of the various longitudinal range acceleration values of the particular target vehicle with respect to each of the other vehicles (or third vehicles). This calculation is preferably performed by the processor 250 of FIG. 2 based on the data of steps 302-308 and/or the calculations of step 312. A determination is made, preferably by the processor 250 of FIG. 2, as to whether the standard deviation of the longitudinal range acceleration is greater than a predetermined threshold (step 422). The predetermined threshold of step 422 is preferably stored as one of the stored values 262 of the memory 252 of FIG. 2, and preferably represents an average or acceptable value of the standard deviation of the longitudinal range acceleration for typical vehicles that are operating in a benign or non-threatening manner with respect to other vehicles.

If it is determined in step 422 that the standard deviation of the longitudinal range acceleration is greater than the predetermined threshold of step 422, then a third counter is incremented (step 424). The third counter, also referred to herein as an EH Counter, is used for determining whether the target vehicle is moving in a manner that is erratic toward the host vehicle. The EH Counter is preferably incremented by the processor 250 of FIG. 1. Conversely, if it is determined in step 422 that the standard deviation of the longitudinal range acceleration is less than or equal to the predetermined threshold of step 422, then the EH Counter is not incremented. In either case, the process proceeds to step 426, described directly below.

During step 426, a longitudinal velocity is calculated for each target vehicle. The longitudinal velocity is preferably calculated by subtracting the range rate between the host and target vehicles from the velocity of the host vehicle). This calculation is preferably performed by the processor 250 of FIG. 2 based on the data of steps 302-308 and/or the calculations of step 312. A determination is made, preferably by the processor 250 of FIG. 2, as to whether the longitudinal velocity is greater than a predetermined threshold (step 428). The predetermined threshold of step 428 is preferably stored as one of the stored values 262 of the memory 252 of FIG. 2, and preferably represents an average or acceptable value of the longitudinal velocity for typical vehicles that are operating in a benign or non-threatening manner with respect to other vehicles.

If it is determined in step 428 that the longitudinal velocity is greater than the predetermined threshold of step 428, then a fourth counter is incremented (step 430). The fourth counter, also referred to herein as an AH Counter, is used for determining whether the target vehicle is moving in a manner that is aggressive toward the host vehicle. The AH Counter is preferably incremented by the processor 250 of FIG. 1. Conversely, if it is determined in step 428 that the longitudinal velocity is less than or equal to the predetermined threshold of step 428, then the AH Counter is not incremented. In either case, the process proceeds to step 432, described directly below.

During step 432, a longitudinal acceleration is calculated for each target vehicle. For each target vehicle, the longitudinal acceleration is preferably calculated by subtracting the range acceleration of the target vehicle (i.e., the acceleration of the range between the target and host vehicles) from the acceleration of the host vehicle. This calculation is preferably performed by the processor 250 of FIG. 2 based on the data of steps 302-308 and/or the calculations of step 312. A determination is made, preferably by the processor 250 of FIG. 2, as to whether the magnitude of longitudinal acceleration is greater than a predetermined threshold (step 434). The predetermined threshold of step 434 is preferably stored as one of the stored values 262 of the memory 252 of FIG. 2, and preferably represents an average or acceptable value of the longitudinal acceleration for typical vehicles that are operating in a benign or non-threatening manner with respect to other vehicles.

If it is determined in step 434 that the magnitude of longitudinal acceleration is greater than the predetermined threshold of step 434, then the AH counter is incremented (step 436). The AH Counter is preferably incremented by the processor 250 of FIG. 1. Conversely, if it is determined in step 434 that the longitudinal acceleration is less than or equal to the predetermined threshold of step 434, then the AH Counter is not incremented. In either case, the process proceeds to step 438, described directly below.

During step 438, a standard deviation of the longitudinal acceleration is calculated for each target vehicle. For each target vehicle, the standard deviation of the longitudinal acceleration is preferably calculated by taking the standard deviation of the different values of longitudinal acceleration for the target vehicle respect to each of the other vehicles (or third vehicles). This calculation is preferably performed by the processor 250 of FIG. 2 based on the data of steps 302-308 and/or the calculations of step 312. A determination is made, preferably by the processor 250 of FIG. 2, as to whether the standard deviation of the longitudinal acceleration is greater than a predetermined threshold (step 440). The predetermined threshold of step 440 is preferably stored as one of the stored values 262 of the memory 252 of FIG. 2, and preferably represents an average or acceptable value of the standard deviation of the longitudinal acceleration for typical vehicles that are operating in a benign or non-threatening manner with respect to other vehicles.

If it is determined in step 440 that the standard deviation of the longitudinal acceleration is greater than the predetermined threshold of step 440, then the AO counter is incremented (step 442). The AO Counter is preferably incremented by the processor 250 of FIG. 1. Conversely, if it is determined in step 440 that the standard deviation of the longitudinal acceleration is less than or equal to the predetermined threshold of step 440, then the AO Counter is not incremented. In either case, the process proceeds to step 444, described directly below.

During step 444, a vector closing rate is calculated for each target vehicle. For each target vehicle, the vector closing rate is preferably calculated by taking the square root of the sum of squares of the longitudinal range rate and the latitudinal range rate for the target vehicle with respect to the host vehicle. This calculation is preferably performed by the processor 250 of FIG. 2 based on the data of steps 302-308 and/or the calculations of step 312. A determination is made, preferably by the processor 250 of FIG. 2, as to whether the vector closing rate is greater than a predetermined threshold (step 446). The predetermined threshold of step 446 is preferably stored as one of the stored values 262 of the memory 252 of FIG. 2, and preferably represents an average or acceptable value of the vector closing rate for typical vehicles that are operating in a benign or non-threatening manner with respect to other vehicles.

If it is determined in step 446 that the vector closing rate is greater than the predetermined threshold of step 446, then the AH counter is incremented (step 448). The AH Counter is preferably incremented by the processor 250 of FIG. 1. Conversely, if it is determined in step 446 that the vector closing rate is less than or equal to the predetermined threshold of step 446, then the AH Counter is not incremented. In either case, the process proceeds to step 450, described directly below.

During step 450, a standard deviation of the vector closing rate is calculated for each target vehicle. For each target vehicle, the standard deviation of the vector closing rate is preferably calculated by calculating the standard deviation of the various vector closing rates for the target vehicle with respect to each of the other vehicles (or third vehicles). This calculation is preferably performed by the processor 250 of FIG. 2 based on the data of steps 302-308 and/or the calculations of step 312. A determination is made, preferably by the processor 250 of FIG. 2, as to whether the standard deviation of the vector closing rate is greater than a predetermined threshold (step 452). The predetermined threshold of step 452 is preferably stored as one of the stored values 262 of the memory 252 of FIG. 2, and preferably represents an average or acceptable value of the standard deviation of the vector closing rate for typical vehicles that are operating in a benign or non-threatening manner with respect to other vehicles.

If it is determined in step 452 that the standard deviation of the vector closing rate is greater than the predetermined threshold of step 452, then the EH counter is incremented (step 454). The EH Counter is preferably incremented by the processor 250 of FIG. 1. Conversely, if it is determined in step 452 that the standard deviation of the vector closing rate is less than or equal to the predetermined threshold of step 452, then the EH Counter is not incremented. In either case, the process proceeds to step 456, described directly below.

During step 456, a determination is made as to whether the AH Counter is greater than a predetermined threshold. The predetermined threshold of step 456 is preferably stored as one of the stored values 262 in the memory 252 of FIG. 1. The determination of step 456 is preferably made by the processor 456 of FIG. 1.

If it is determined in step 456 that the AH Counter is greater than the predetermined threshold of step 456, then the target vehicle is classified as moving aggressively toward the host vehicle (step 458), and appropriate action is taken in light of this classification (step 460). The action of step 460 preferably comprises a warning provided by the driver notification unit 208 of FIG. 2 as well as an adjustment of an entrance threshold for one or more active safety features of the active safety control system 170 of FIG. 1, via instructions provided by the processor 250 of FIG. 2. In one embodiment, one or more entrance thresholds for an automatic braking and/or automatic steering system are increased by a third level of magnitude, such that automatic braking and/or automatic steering are provided relatively sooner (for example, when the target vehicle is still relatively farther away from the target vehicle) as compared to typical conditions in which the target vehicle is being operated in a benign manner. Thresholds may similarly be adjusted for other active safety features, such as collision imminent braking systems (CIB), collision preparation systems (CPS), enhanced collision avoidance (ECA) systems, adaptive cruise control (ACC), and forward collision alert (FCA). The processor 250 of FIG. 2 also preferably performs the classification of step 458.

Conversely, if it is determined in step 456 that the AH Counter is less than or equal to the predetermined threshold of step 456, then no classification is made at this time. In either case, the process proceeds to step 462, described directly below.

During step 462, a determination is made as to whether the EH Counter is greater than a predetermined threshold. The predetermined threshold of step 462 is preferably stored as one of the stored values 262 in the memory 252 of FIG. 1. The determination of step 462 is preferably made by the processor 462 of FIG. 1.

If it is determined in step 462 that the EH Counter is greater than the predetermined threshold of step 462, then the target vehicle is classified as moving erratically toward the host vehicle (step 464), and appropriate action is taken in light of this classification (step 466). The action of step 466 preferably includes a warning provided by the driver notification unit 208 of FIG. 2 as well as an adjustment of an entrance threshold for one or more active safety features of the active safety control system 170 of FIG. 1, via instructions provided by the processor 250 of FIG. 2. In one embodiment, one or more entrance thresholds for an automatic braking and/or automatic steering system are increased by a second level of magnitude (less than the third level of magnitude of step 460), such that automatic braking and/or automatic steering are provided relatively sooner (for example, when the target vehicle is still relatively farther away from the target vehicle) as compared to typical conditions in which the target is being operated in a benign manner, but relatively later as compared to when the target vehicle is being operated in an aggressive manner toward the host vehicle. Thresholds may similarly be adjusted for other active safety features, such as collision imminent braking systems (CIB), collision preparation systems (CPS), enhanced collision avoidance (ECA) systems, adaptive cruise control, and forward collision alert (FCA). The processor 250 of FIG. 2 also preferably performs the classification of step 464.

Conversely, if it is determined in step 462 that the EH Counter is less than or equal to the predetermined threshold of step 462, then no classification is made at this time. In either case, the process proceeds to step 468, described directly below.

During step 468, a determination is made as to whether the AO Counter is greater than a predetermined threshold. The predetermined threshold of step 468 is preferably stored as one of the stored values 262 in the memory 252 of FIG. 1. The determination of step 468 is preferably made by the processor 468 of FIG. 1.

If it is determined in step 468 that the AO Counter is greater than the predetermined threshold of step 468, then the target vehicle is classified as moving aggressively toward a third vehicle (step 470), and appropriate action is taken in light of this classification (step 472). The action of step 472 preferably includes a warning provided by the driver notification unit 208 of FIG. 2 as well as an adjustment of an entrance threshold for one or more active safety features of the active safety control system 170 of FIG. 1, via instructions provided by the processor 250 of FIG. 2. In one embodiment, one or more entrance thresholds for an automatic braking and/or automatic steering system are increased by a first level of magnitude (less than the third level of magnitude of step 460 and the second level of magnitude of step 466), such that automatic braking and/or automatic steering are provided relatively sooner (for example, when the target vehicle is still relatively farther away from the target vehicle) as compared to typical conditions in which the target vehicle is being operated in a benign manner, but relatively later as compared to when the target vehicle is being operated in an aggressive or erratic manner toward the host vehicle. Thresholds may similarly be adjusted for other active safety features, such as collision imminent braking systems (CIB), collision preparation systems (CPS), enhanced collision avoidance (ECA) systems, adaptive cruise control, and forward collision alert (FCA). The processor 250 of FIG. 2 also preferably performs the classification of step 470.

Conversely, if it is determined in step 468 that the AO Counter is less than or equal to the predetermined threshold of step 468, then no classification is made at this time. In either case, the process proceeds to step 474, described directly below.

During step 474, a determination is made as to whether the EO Counter is greater than a predetermined threshold. The predetermined threshold of step 474 is preferably stored as one of the stored values 262 in the memory 252 of FIG. 1. The determination of step 474 is preferably made by the processor 474 of FIG. 1.

If it is determined in step 474 that the EO Counter is greater than the predetermined threshold of step 474, then the target vehicle is classified as moving erratically toward a third vehicle (step 476), and appropriate action is taken in light of this classification (step 478). The action of step 478 preferably comprises a warning provided by the driver notification unit 208 of FIG. 2 via instructions provided by the processor 250 of FIG. 2. In certain embodiments, thresholds may be adjusted for active safety features, such as automatic steering, automatic braking, collision imminent braking systems (CIB), collision preparation systems (CPS), enhanced collision avoidance (ECA) systems, adaptive cruise control, and forward collision alert (FCA). Following step 478, the present decision-making for the target vehicle terminates (step 482), although the entire process preferably continues throughout the ignition cycle of the host vehicle.

Conversely, if it is determined in step 474 that the EO Counter is less than or equal to the predetermined threshold of step 474 (and provided that the movement of the target vehicle is not otherwise categorized as being aggressive or erratic toward the host vehicle or any third vehicles), then the movement of the target vehicle is classified as being benign, or consistent with typical vehicle operation (step 480). This classification is preferably made by the processor 250 of FIG. 2. As such, no warnings or adjustments to the active safety control system are required. The present decision-making for the target vehicle terminates (step 482), although the entire process preferably continues throughout the ignition cycle of the host vehicle.

In certain embodiments, the warnings and/or actions may vary if more than one classification is met. In one such example, the process arbitrate, for example based on respective priorities of the classifications. In other embodiments, the process may add the threshold adjustments of the different classifications for a single, aggregate determination/classification. Also in certain embodiments, the process may utilize a threshold adjustment for such an aggregate determination/classification that is greater than any single one of the active classifications but less than the sum of all of the active classifications.

Accordingly, improved methods, program products, systems, and vehicles are provided for classifying movement of target vehicles in proximity to a host vehicle during vehicle operation, for example on a roadway. The improved methods, program products, systems, and vehicles provide for classification of the movement of the target vehicle as either benign, erratic toward other vehicles, aggressive toward other vehicles, erratic toward the host vehicle, or aggressive toward the host vehicle. Warnings and remedial actions, including adjustment of entry conditions to active safety functionality such as automatic braking and automatic steering, are selectively implemented based upon the classification of the target vehicle.

It will be appreciated that the disclosed methods, systems, and vehicles may vary from those depicted in the Figures and described herein. For example, the host vehicle 100, ASCS 170, and/or various components thereof may vary from that depicted in FIGS. 1 and 2 and described in connection therewith. Similarly, the host vehicle 100, the target vehicles (and/or third vehicles) 504, and/or the placement thereof may differ from that depicted in FIG. 5. In addition, it will be appreciated that certain steps of the process 300 (and/or sub-processes or sub-steps thereof) may vary from those depicted in FIGS. 3 AND 4 and/or described above in connection therewith. It will similarly be appreciated that certain steps of the process described above (and/or sub-processes or sub-steps thereof) may occur simultaneously or in a different order than that depicted in FIGS. 3 AND 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:
1. A method comprising:
   measuring movement of a target vehicle in proximity to a host vehicle;
   assessing a pattern of the movement of the target vehicle relative to the host vehicle or a third vehicle;
   generating, via a processor, a classification by classifying the movement of the target vehicle as:
      erratic if the pattern represents a first deviation from a typical vehicle movement; and
      aggressive if the pattern represents a second deviation from the typical vehicle movement, the second deviation being greater than the first deviation; and
   taking action based on the classification.
2. The method of claim 1, wherein:
   the step of classifying the movement of the target vehicle as erratic comprises:
      classifying the movement of the target vehicle as erratic toward the third vehicle if the pattern represents the first deviation from the typical vehicle movement in proximity to the third vehicle; and
      classifying the movement of the target vehicle as erratic toward the host vehicle if the pattern represents the first deviation from the typical vehicle movement in proximity to the host vehicle; and
   the step of classifying the movement of the target vehicle as aggressive comprises:

classifying the movement of the target vehicle as aggressive toward the third vehicle if the pattern represents the second deviation from the typical vehicle movement in proximity to the third vehicle; and classifying the movement of the target vehicle as aggressive toward the host vehicle if the pattern represents the second deviation from the typical vehicle movement in proximity to the host vehicle.

3. The method of claim 2, wherein the step of taking action comprises:
taking a first action if the movement of the target vehicle is classified as erratic toward the third vehicle;
taking a second action if the movement of the target vehicle is classified as aggressive toward the third vehicle;
taking a third action if the movement of the target vehicle is classified as erratic toward the host vehicle; and
taking a fourth action if the movement of the target vehicle is classified as aggressive toward the host vehicle, wherein the first action, the second action, the third action, and the fourth action are each different from one another.

4. The method of claim 1, wherein:
the step of classifying the movement of the target vehicle comprises classifying the movement of the target vehicle as erratic versus aggressive based on a relative velocity of the target vehicle relative to the host vehicle or the third vehicle.

5. The method of claim 1, wherein:
the step of classifying the movement of the target vehicle comprises classifying the movement of the target as erratic versus aggressive vehicle based on a vector closing rate between the target vehicle and the target vehicle or the third vehicle.

6. The method of claim 1, wherein:
the step of classifying the movement of the target vehicle comprises classifying the movement of the target vehicle as erratic versus aggressive based on a lateral range between the target vehicle and the target vehicle or the third vehicle.

7. The method of claim 1, wherein:
the step of classifying the movement of the target vehicle comprises classifying the movement of the target vehicle as erratic versus aggressive based on a longitudinal range acceleration between the target vehicle and the target vehicle or the third vehicle.

8. The method of claim 1, wherein:
the step of classifying the movement of the target vehicle comprises classifying the movement of the target vehicle as erratic versus aggressive based on a longitudinal velocity of the target vehicle.

9. A program product comprising:
a program configured to at least facilitate:
measuring movement of a target vehicle in proximity to a host vehicle;
assessing a pattern of the movement of the target vehicle relative to the host vehicle or a third vehicle;
generating a classification by classifying the movement of the target vehicle as:
erratic if the pattern represents a first deviation from a typical vehicle movement; and
aggressive if the pattern represents a second deviation from the typical vehicle movement, the second deviation being greater than the first deviation; and
taking action based on the classification; and
a non-transitory computer-readable storage medium storing the program.

10. The program product of claim 9, wherein the program is further configured to at least facilitate:
classifying the movement of the target vehicle as erratic toward the third vehicle if the pattern represents the first deviation from the typical vehicle movement in proximity to the third vehicle;
classifying the movement of the target vehicle as erratic toward the host vehicle if the pattern represents the first deviation from the typical vehicle movement in proximity to the host vehicle; and
classifying the movement of the target vehicle as aggressive toward the third vehicle if the pattern represents the second deviation from the typical vehicle movement in proximity to the third vehicle; and
classifying the movement of the target vehicle as aggressive toward the host vehicle if the pattern represents the second deviation from the typical vehicle movement in proximity to the host vehicle.

11. The program product of claim 10, wherein the program is further configured to at least facilitate:
taking a first action if the movement of the target vehicle is classified as erratic toward the third vehicle;
taking a second action if the movement of the target vehicle is classified as aggressive toward the third vehicle;
taking a third action if the movement of the target vehicle is classified as erratic toward the host vehicle; and
taking a fourth action if the movement of the target vehicle is classified as aggressive toward the host vehicle, wherein the first action, the second action, the third action, and the fourth action are each different from one another.

12. A vehicle comprising:
a drive system; and
an active safety system coupled to the drive system, the active safety system comprising:
a sensor unit configured to measure movement of a target vehicle in proximity to a host vehicle; and
a processor coupled to the sensor unit and configured to:
assess a pattern of the movement of the target vehicle relative to the host vehicle or a third vehicle;
generate a classification by classifying the movement of the target vehicle as:
erratic if the pattern represents a first deviation from a typical vehicle movement; and
aggressive if the pattern represents a second deviation from the typical vehicle movement, the second deviation being greater than the first deviation; and
take action based on the classification.

13. The vehicle of claim 12, wherein the processor is further configured to:
classify the movement of the target vehicle as erratic toward the third vehicle if the pattern represents the first deviation from the typical vehicle movement in proximity to the third vehicle; and
classify the movement of the target vehicle as erratic toward the host vehicle if the pattern represents the first deviation from the typical vehicle movement in proximity to the host vehicle;
classify the movement of the target vehicle as aggressive toward the third vehicle if the pattern represents the second deviation from the typical vehicle movement in proximity to the third vehicle; and
classifying the movement of the target vehicle as aggressive toward the host vehicle if the pattern represents the second deviation from the typical vehicle movement in proximity to the host vehicle.

14. The vehicle of claim 13, wherein the processor is further configured to:
- take a first action if the movement of the target vehicle is classified as erratic toward the third vehicle;
- take a second action if the movement of the target vehicle is classified as aggressive toward the third vehicle;
- take a third action if the movement of the target vehicle is classified as erratic toward the host vehicle; and
- take a fourth action if the movement of the target vehicle is classified as aggressive toward the host vehicle, wherein the first action, the second action, the third action, and the fourth action are each different from one another.

15. The vehicle of claim 12, wherein the processor is further configured to:
- classify the movement of the target vehicle as erratic versus aggressive based on a relative velocity of the target vehicle relative to the host vehicle or the third vehicle.

16. The vehicle of claim 12, wherein the processor is further configured to classify the movement of the target vehicle as erratic versus aggressive based on a vector closing rate between the target vehicle and the target vehicle or the third vehicle.

17. The vehicle of claim 12, wherein the processor is further configured to classify the movement of the target vehicle as erratic versus aggressive based on a lateral range between the target vehicle and the target vehicle or the third vehicle.

* * * * *